United States Patent Office 3,529,929
Patented Sept. 22, 1970

3,529,929
PROCESS FOR PRODUCTION OF FINELY DIVIDED CALCIUM FLUORIDE
Eric John Page and Trevor Raymond White, Pontypool, England, assignors to Imperial Chemical Industries Limited, London, England, a corporation of Great Britain
No Drawing. Filed July 22, 1968, Ser. No. 746,301
Claims priority, application Great Britain, July 31, 1967, 35,015/67
Int. Cl. C01f *11/22*
U.S. Cl. 23—88                     2 Claims

ABSTRACT OF THE DISCLOSURE

The present invention relates to finely divided calcium fluoride and to a method for the preparation thereof.

---

Calcium fluoride has been found to be a particularly effective nucleating agent for certain polyamides, for example, polyhexamethylene adipamide, which may be melt spun and subsequently drawn to yield commercially acceptable textile filaments, there being significant process advantages in the manufacture of filaments from these polyamides when nucleating as aforesaid. In order that maximum efficiency is obtained with the calcium fluoride it is necessary that this be in a very finely divided state. In our copending patent application No. 50,471/66 relating to the use of calcium fluoride as a nucleating agent for polyamides, we have described one method, inter alia, by which such finely divided calcium fluoride may be obtained, that is by the double decomposition of calcium and fluoride salts in aqueous solutions or suspensions at or near the boiling points thereof.

We have now found that a more finely divided calcium fluoride having a mean particle size of between 150 to 800 A. diameter is conveniently obtained by the double decomposition of calcium and fluoride salts in aqueous solution or suspensions under more closely defined conditions of temperature and concentration. A surprising increase in effectiveness of nucleating polyhexamethylene adipamide is achieved with calcium fluoride of this fineness.

Accordingly, therefore, from one aspect, the present invention provides finely divided calcium fluoride having a mean particle size of 150 to 800 A. diameter.

The finely divided calcium fluoride as defined above is obtained by the rapid mixing of aqueous solutions or suspensions containing calcium and fluoride at a temperature of from 0° to 60° C., preferably 20 to 40° C. The concentration of the calcium salt in one reacting solution or suspension, expressed as grams of calcium per litre of water, should preferably be not less than 6 and the concentration of fluoride in the other reacting solution or suspensions should preferably be the stoichiometrical equivalent.

According to another aspect, therefore, the present invention provides a process for the production of finely divided calcium fluoride wherein aqueous solutions or suspensions containing calcium and aqueous solutions or suspensions containing a fluoride are rapidly mixed at a temperature of from 10 to 60° C.

Preferably, the calcium and fluoride should be in stoichiometric proportions and the aqueous solution or suspension of calcium should contain not less than 6 grams per litre of calcium.

It is also preferred that at least one of the reacting solutions should be saturated and the temperature should be in the range of 20 to 40° C. Preferably also the mixing is assisted by high speed stirring and is carried out as a continuous operation.

Suitable water soluble calcium salts are, for example, calcium acetate, chloride and hypophosphite or a complex calcium salt with adipic and amino caproic acids. Suitable soluble fluorides are potassium or ammonium fluoride or hexamethylene diammonium difluoride. The calcium may also be in the form of calcium hydroxide and the fluoride in the form of hydrofluoric acid.

The following examples illustrate, but do not limit the scope of the present invention.

EXAMPLE 1

The reacting solutions are prepared from 1055 grams of calcium acetate (91% pure) dissolved in 3103 ml. of demineralised water to form a saturated solution, and 760 grams of potassium fluoride (94% pure) dissolved in 3103 ml. of demineralised water. The solutions are filtered and the potassium fluoride solution made up to the same volume as the calcium acetate solution. The filtered solutions at room temperature, are pumped separately at equal volume rates by means of a micro pump into the arms of a glass T piece of one quarter of an inch internal diameter.

The stoichiometrically balanced solutions meet and interact at the joint of the T piece and the reacted suspension of calcium fluoride precipitate together with potassium acetate solution is impelled through the open end thereof into a suitable container. To increase the rate of reaction a stainless steel stirrer is inserted in the open end of the T piece into the reaction zone and rotated at a speed of 1,500 r.p.m.

The resultant suspension contains 500 grams of calcium fluoride having a mean particle size of about 150 to 800 A. as measured on an electron microscope at 10,000 times magnification. The suspension is thixotropic.

The gel suspension is diluted to make a final concentration of 0.6% calcium fluoride by making up to 83 litres with dimineralised water. The flocculated calcium fluoride is allowed to settle for 4 to 6 hours and the supernated clear liquid siphoned off. The suspension is then rediluted to 0.6%, allowed to settle for 48 to 64 hours and the clear supernatant liquid decanted off and further demineralised water added to give a 0.6% concentration once again.

The colloidal solution as prepared above was used to nucleate 66 nylon by addition during continuous polymerisation to give a concentration of calcium fluoride in the final spun yarn of 0.1% by weight. The resultant yarn contained approximately 15 particles of calcium fluoride per cubic micron and was found to be well nucleated and gave a productivity ratio of 33%. The undrawn yard had an X-ray orientation parameter ($0_i$–$0_o$) of 0.23.

Productivity ratio is defined as:

$$\frac{\text{Draw ratio to yield 30\% extension at break for a filament containing a nucleating agent}}{\text{Draw ratio to yield 30\% extension at break for a filament without nucleating agent}}$$

The X-ray orientation parameter ($0_i$–$0_o$) and method of determination is described in our copending application for Letters Patent No. 39,122/65.

EXAMPLE 2

A gel suspension of calcium fluoride similar in appearance to that obtained in Example 1 is made by the rapid mixing of a solution of 79.1 grams of calcium acetate in 144 ml. of demineralised water with 200 ml. of the 39% (w./v.) solution of hexamethylene diammonium fluoride (HMD.2HF). This gel contains 39 grams of colloidal calcium fluoride and is chip blended with 86 pounds of nylon 6.6 polymer chip in a Gardiner mixer to give a final concentration of calcium fluoride of 0.1%.

The chipped polyamide is spun to a well nucleated monofilament having an improved productivity.

EXAMPLE 3

247 grams of calcium acetate (96% pure) is dissolved in 732 cc. of water at 0° C. and 178 grams of potassium fluoride (98% pure) is dissolved in 460 cc. of water at 0° C. The two solutions are stirred and mixed rapidly to precipitate calcium fluoride. The colloidal gel of calcium fluoride is chip blended with nylon 6.6 to give a final concentration of calcium fluoride of 0.1%. The blended chip is spun to give a well nucleated yarn with a productivity ratio as defined in Example 1 of 31% and an X-ray orientation parameter as defined in Example 1 of 0.54%.

A slurry of the finely divided calcium fluoride may also be incorporated in the polymer during the polymerisation process. It is clearly necessary that for such incorporation the slurry should be stable and this may be achieved by the use of demineralised water and especially clean apparatus and a dispersing agent may also be employed. In adding the slurry to the polymerisate it is preferred that this be done during the end of the evaporation stage (cycle 2) and not to the ionic salt solution since this is likely to flocculate the calcium fluoride.

EXAMPLE 4

5670 grams of a 1% w./w. calcium fluoride aqueous colloidal suspension prepared by the method described in Example 1 is injected into a 30-gallon autoclave late during cycle 2 of the 6.6 nylon polymerisation process. The extruded high molecular weight polymer contains 0.1% calcium fluoride. It is chip cut and melt spun to yield a highly nucleated yarn. This productivity ratio as defined in Example 1 was 23% and the X-ray orientation parameter as defined in Example 1 was 0.38%.

EXAMPLE 5

35 cc. of an 85% w./v. aqueous solution of potassium fluoride is rapidly added at room temperature to 35 cc. of a stirred 81% w./v. aqueous solution of calcium chloride.

The solution which contains precipitated calcium fluoride, is centrifuged at 4,000 r.p.m., redispersed in demineralised water by stirring and recentrifuged at 4,000 r.p.m. The sediment is again redispersed in demineralised water to yield a deflocculated colloidal suspension suitable for addition to 6.6 nylon during cycle 2 of the polymerisation to yield a highly nucleated product. The calcium fluoride particle size is similar to that observed in Example 1.

EXAMPLE 6

131 cc. of a 13% w./v. aqueous solution of calcium hypophosphite is rapidly added at room temperature to 14.8 cc. of a stirred 50% w./v. aqueous solution of ammonium fluoride.

The solution, which contains precipitated calcium fluoride, is allowed to settle for 6 hours and the clear supernatant liquid is decanted and thrown away. The suspension is then diluted with demineralised water to 0.6% w./v. and allowed to settle for 64 hours. The clear supernatant liquid was again decanted and thrown away and the calcium fluoride suspension rediluted to 0.6% w./v. The deflocculated colloidal suspension was suitable for addition to 6.6 nylon during cycle 2 of the polymerisation to yield a highly nucleated product. The calcium fluoride particle size was similar to that observed in Example 1.

An alternative method of incorporating the calcium fluoride during polymerisation is to add the slurry during continuous polymerisation. Thus a stable slurry may be pumped by the displacement pump into a continuous polymerisation coil, such as that described in British patent specification No. 924,630, at an injection point situated preferably 70% along the evaporator section.

EXAMPLE 7

The calcium fluoride suspension together with potassium acetate is prepared by continuous precipitation by pumping into a glass T piece and stirring at 1,500 r.p.m. as described in Example 1.

The thixotropic suspension is diluted with demineralised water and passed through a centrifuge. The calcium fluoride is removed from the centrifuge as a concentrated aqueous paste which is then dispersed in demineralised water by means of a high speed stirrer. The colloidal solution thus obtained contains particles of similar size to those obtained in Example 1.

The solution is used to nucleate 6.6 nylon by addition during continuous polymerisation to give a concentration of calcium fluoride in the final spun yarn of 0.1% by weight. The yarn was found to be well nucleated. The productivity ratio as defined in Example 1 was 39% and the X-ray orientation parameter as defined in Example 1 was 0.31%.

EXAMPLE 8

65.5 grams of amino-caproic acid and 80.3 grams of adipic acid are dissolved together in 1.5 litres of demineralised water by warming. 28 grams of powdered calcium oxide is then dissolved in the cold solution of the two acids by stirring for 2½ hours and the solution is filtered. 289 cc. of a 27% w./v. aqueous solution of hexamethylene diammonium difluoride (78 g. HMD.2HF) is then added rapidly at room temperature to the stirred solution containing calcium. Colloidal calcium fluoride is precipitated which contains particles similar in size to those obtained in Example 1.

The colloidal solution as prepared above was used to nucleate 6.6 nylon by addition during continuous polymerisation to give a concentration of calcium fluoride in the final yarn of 0.1% by weight. The yarn was found to be well nucleated. The productivity ratio as defined in Example 1 was 37% and the X-ray orientation parameter as defined in Example 1 was 0.4.

EXAMPLE 9

803 cc. of concentrated fine particle size calcium hydroxide aqueous suspension of strength 3.12 N ("milk of lime") is stirred in a beaker whilst 867 cc. of 2.89 N aqueous hydrofluoric acid solution is slowly added. The addition rate is such that the temperature of the reacting mixture does not exceed 30° C. The resultant calcium fluoride suspension is allowed to stand for three days and is then decanted and the sediment rejected. The supernatant suspension is colloidal and contains calcium fluoride particles similar in size to those obtained in Example 1. The yield of colloidal calcium fluoride was 68% of the theoretical total calcium fluoride produced.

The colloidal solution was used to nucleate 6.6 nylon by addition during continuous polymerisation to give a productivity ratio as defined in Example 1 of 40% and an X-ray orientation parameter as defined in Example 1 of 0.47.

EXAMPLE 10

1898 grams of calcium acetate is dissolved in 8 litres of demineralised water. 1394 grams of potassium fluoride is dissolved in 3 litres of demineralised water. Both solutions are filtered to remove any solid impurities. The calcium acetate solution is added to 100 litres of demineralised water at 60° C. and the solution circulated through a calmic filter and reservoir. The potassium fluoride solution at 60° C. is then added and circulation continued for 1–2 minutes to ensure complete mixing. The precipitated calcium fluoride is filtered and washed with demineralised water. The slurry is then passed through a bead mill and used to nucleate 6.6 nylon during continuous polymerisation to give a final concentration of calcium fluoride in the spun yarn of 1.0%. The resultant yarn was found to be well nucleated to give a productivity ratio as defined in Example 1, of 32% and an X-ray orientation parameter as defined in Example 1 of 0.5.

What we claim is:

1. A process for the production of finely divided calcium fluoride having a mean particle size of 150–800 A. diameter comprising rapidly mixing an aqueous solution containing the calcium salts of aminocaproic acid and adipic acid with an aqueous solution containing a member selected from the group consisting of potassium fluoride, ammonium fluoride, hexamethylene diammonium difluoride or hydrofluoric acid at a temperature between 0° to 60° C.

2. The process of claim 1 wherein the calcium and fluoride are present in substantially stoichiometric proportions.

References Cited

UNITED STATES PATENTS

| | | | |
|---|---|---|---|
| 2,371,759 | 3/1945 | King et al. | 23—88 |
| 2,653,857 | 9/1953 | Ross et al. | 23—88 |
| 2,738,255 | 3/1956 | Sullivan et al. | 23—88 XR |
| 2,853,363 | 9/1958 | Sidun et al. | 23—88 |
| 3,357,788 | 12/1967 | Ross | 23—88 |

FOREIGN PATENTS 947,068   1/1964   Great Britain.

OTHER REFERENCES

Dr. J. H. Simons' book: "Fluorine Chemistry," vol. 1, 1950 ed., p. 36, Academic Press Inc., N.Y.

AEC–tr–3927 (Port 2) book: "The Chemistry of Fluorine and Its Inorganic Compounds," by Prof. I. G. Ryss, p. 809.

EDWARD STERN, Primary Examiner